Oct. 6, 1953   J. M. CESAR   2,654,286
OPTICAL VIEWING DEVICE FOR NIGHT DRIVING
Filed July 14, 1950   2 Sheets-Sheet 1
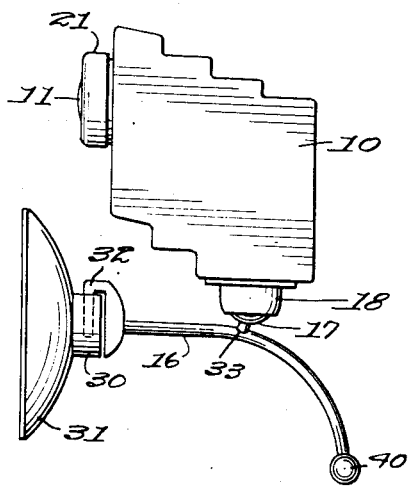
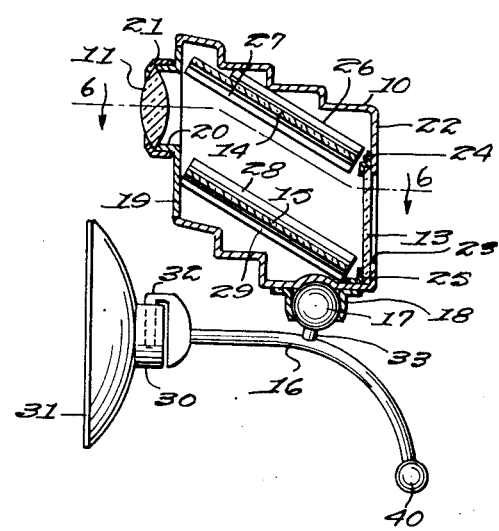
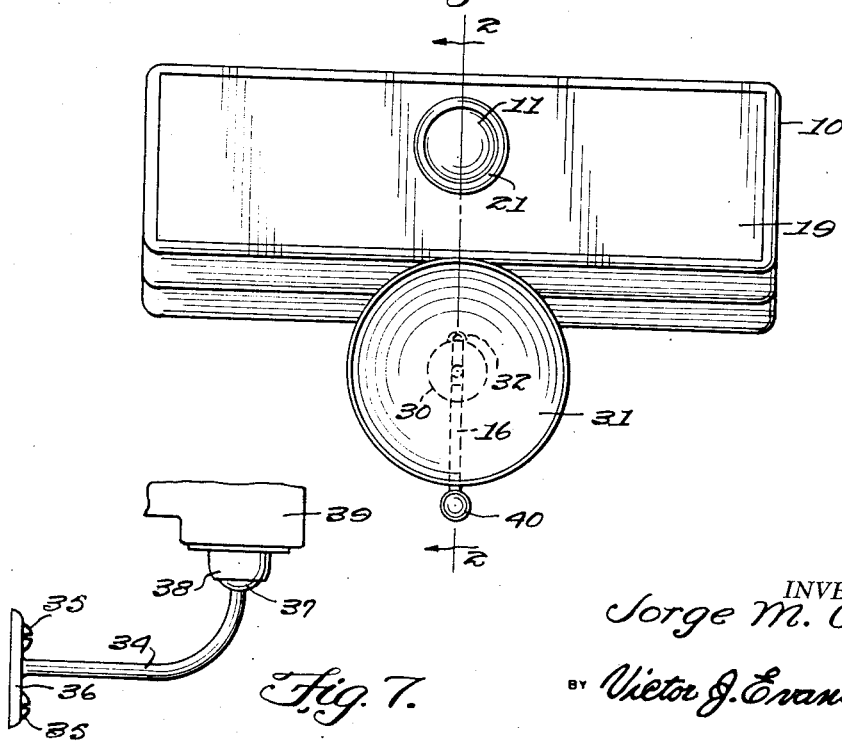
INVENTOR.
Jorge M. Cesar,
BY Victor J. Evans & Co.
ATTORNEYS Oct. 6, 1953  J. M. CESAR  2,654,286
OPTICAL VIEWING DEVICE FOR NIGHT DRIVING
Filed July 14, 1950  2 Sheets-Sheet 2
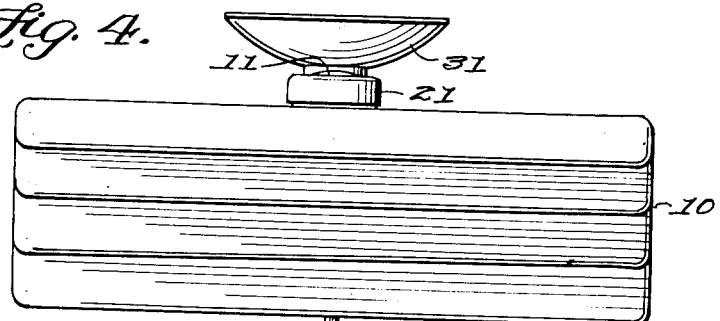
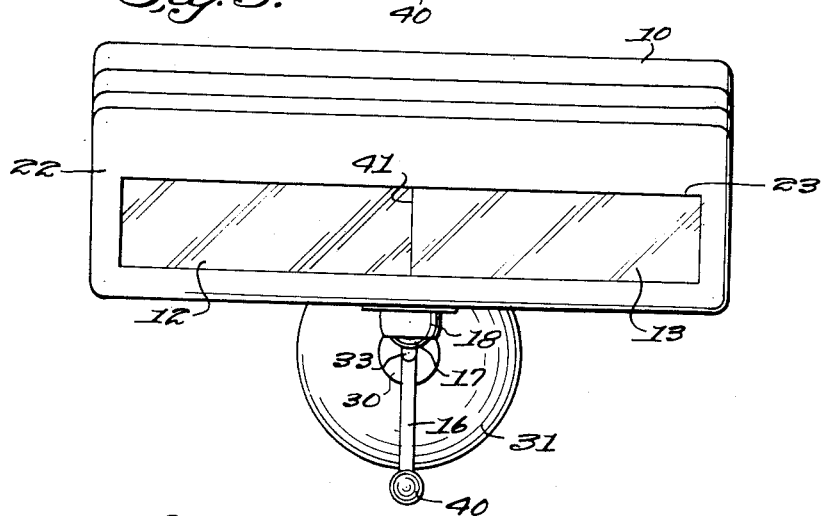
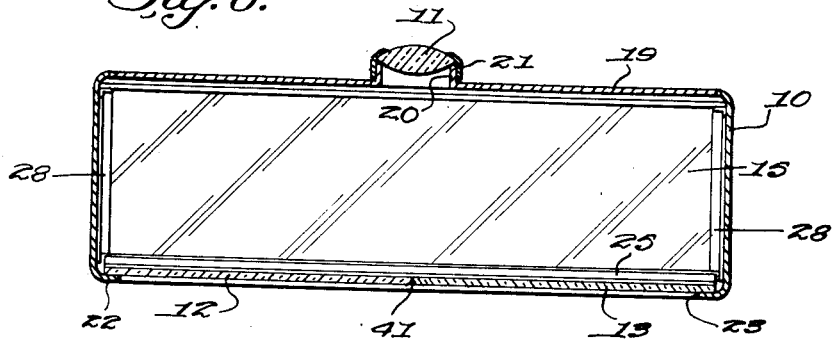
INVENTOR.
Jorge M. Cesar,
BY Victor J. Evans & Co.
ATTORNEYS Patented Oct. 6, 1953

2,654,286

UNITED STATES PATENT OFFICE 2,654,286

OPTICAL VIEWING DEVICE FOR NIGHT DRIVING

Jorge M. Cesar, Monterrey, Mexico

Application July 14, 1950, Serial No. 173,899

1 Claim. (Cl. 88—1)

This invention relates to devices for facilitating observing the road or highway in night driving when vision is obstructed by the glare of approaching headlights, and in particular this invention relates to a viewing device positioned for the convenience of the operator of a motor vehicle on which the position of an approaching vehicle is indicated.

The purpose of this invention is to provide a device for readily determining the position of an approaching vehicle where headlight glare obstructs the vision of the operator of a vehicle.

Various devices have been provided for eliminating glare rays particularly of approaching motor vehicles on highways however even though the glare is removed by translucent shields, it is still difficult to determine the position of the approaching vehicle on the highway. With this thought in mind this invention contemplates an indicating device having a dividing line indicating the center of the highway and screens extended from the dividing line whereby with an approaching vehicle appearing on a screen on one side of the dividing line the operator is assured of being in a safe position for passing whereas with the approaching vehicle appearing on the opposite side of the dividing line, there is danger of a headon collision.

The object of this invention is, therefore, to provide means for constructing a viewing device on which the position of an approaching vehicle is accurately indicated.

Another object of the invention is to provide a viewing device for assisting night driving that may readily be installed on vehicles now in use without changing parts of the vehicle.

A further object of the invention is to provide a device for facilitating night driving which is of a simple and economical construction.

With these and other objects and advantages in view the invention embodies a sloping casing having upper and lower mirrors positioned therein with a lens on the forward end and with viewing screens positioned to receive the image of an approaching vehicle reflected by the mirrors from the lens in the rear of the casing, and with means for mounting the casing on a vehicle.

Other features and advantages of the invention will appear from the following description taken in connection with the drawings wherein:

Figure 1 is a side elevational view of the glare eliminating periscope showing the device mounted on a bracket having a vacuum cup thereon for mounting the device on the windshield of a vehicle.

Figure 2 is a longitudinal section through the casing taken on line 2—2 of Figure 3 and showing the mounting bracket in elevation.

Figure 3 is a front elevational view of the device.

Figure 4 is a plan view of the device.

Figure 5 is a rear elevational view showing the viewing screens with the dividing line at the center.

Figure 6 is a sectional plan through the casing taken on line 6—6 of Figure 2.

Figure 7 is a detail showing an elevational view of a mounting bracket of a different type in which the bracket is attached to the frame of the windshield or other part of the vehicle by mounting screws.

Referring now to the drawings wherein like reference characters denote corresponding parts the glare eliminating periscope of this invention includes a stepped casing 10 having a lens 11 in the forward end, and viewing screens 12 and 13 in the back with reflectors 14 and 15 positioned in the casing to reflect rays of light from the lens 11 to the screens 12 and 13, and a mounting bracket 16 having a ball 17 on which the casing 10 is mounted through a socket 18.

The casing 10 is formed with a front wall 19 having a sleeve 20 extended therefrom and the lens 11 is held on the end of the sleeve by a ring 21.

The back of the casing is formed with a plate 22 having a rectangular shaped opening 23 therein and glass plates forming the screens 12 and 13 are held in position over the inner surfaces of the screen openings by clips 24 and 25.

The reflector 14 which is positioned in the upper part of the casing is held by clips 26 and 27 and the reflector 16 which is mounted in the lower part of the casing is held in position by similar clips 28 and 29.

The device may be installed in a motor vehicle through a mounting bracket 16 which is pivotally mounted in a boss 30 of a vacuum cup 31 by a pin 32, the ball 17 being mounted on the bracket 16 through a stem 33, or the ball may be positioned on an arm 34 that may be attached to a frame of a windshield by screws 35 in a flange 36 at the end thereof, as shown in Figure 7 in which the arm 34 is provided with a ball 37 similar to the ball 17 and the ball is positioned in a socket 38 similar to the socket 18 of a casing 39 similar to the casing 10.

With the parts arranged in this manner the device is readily attached to the inner surface of a windshield or other part of the vehicle and the position of the viewing screens 12 and 13 is adjusted by a knob or handle 40 on the end of the bracket or by any suitable means. The device is positioned whereby the screens 12 and 13 are conveniently observed by the operator of the vehicle and whereby the line of sight passing through the lens 11 is reflected upon the viewing screens 12 and 13 so that the image of an approaching vehicle may be observed upon one of the screens. The screen 12, which is positioned to receive the image of the vehicle when the vehicle is in a safe distance for passing may be colored green and the screen 13 may be colored red indicating that with the vehicle appearing on this screen the vehicle is in a dangerous position. The screens are divided by a line 41 and with the device correctly positioned the line may correspond with the white line or center of a highway.

It will be understood that modifications may be made in the design and arrangement of the parts without departing from the spirit of the invention.

What is claimed is:

In a device for determining the position of an approaching vehicle where head-light glare obstructs the vision of an operator of a vehicle, the combination which comprises a casing of rectangular shape in cross section and having vertically spaced parallel front and rear walls, a lens mounted in said front wall of the casing and positioned midway between the ends thereof, an upper horizontally disposed reflector mounted in an inclined position in the upper part of the casing, a lower horizontally disposed reflector also mounted in an inclined position and located in the lower portion of the casing, laterally positioned viewing screens coacting with the lens and reflectors, mounted in the rear wall of the casing, one positioned to show an image of a passing vehicle when said vehicle is in a path a safe distance at the side of the vehicle in which the periscope is positioned and the other screen being positioned to show an image of a vehicle when said vehicle is in the path of the vehicle in which the periscope is positioned, said screen for showing the image of the vehicle a safe distance at the side of the vehicle in which the periscope is positioned being colored green and the screen for showing the image of the vehicle positioned in the path of the vehicle in which the periscope is carried being colored red, and means for mounting said periscope in a motor vehicle.

JORGE M. CESAR.

References Cited in the file of this patent

UNITED STATES PATENTS

| Number | Name | Date |
|---|---|---|
| 1,478,650 | Hallengren | Dec. 25, 1923 |
| 1,733,869 | Edwards | Oct. 29, 1929 |
| 1,751,567 | Wadsworth | Mar. 25, 1930 |
| 1,777,520 | Gillespie | Oct. 7, 1930 |
| 1,871,877 | Buckman | Aug. 16, 1932 |
| 1,969,852 | Markosek | Aug. 14, 1934 |
| 2,307,759 | Crawford | Jan. 12, 1943 |
| 2,534,135 | Lahr et al. | Dec. 12, 1950 |

FOREIGN PATENTS

| Number | Country | Date |
|---|---|---|
| 486,058 | Germany | Nov. 11, 1929 |